United States Patent [19]

Irving

[11] Patent Number: 4,482,679
[45] Date of Patent: Nov. 13, 1984

[54] HEAT-CURABLE EPOXY COMPOSITIONS CONTAINING DIARYLIODOSYL SALTS

[75] Inventor: Edward Irving, Burwell, England

[73] Assignee: Ciba-Geigy Corporation, Ardsley, N.Y.

[21] Appl. No.: 530,803

[22] Filed: Sep. 9, 1983

[30] Foreign Application Priority Data

Sep. 18, 1982 [GB] United Kingdom ............... 8226705

[51] Int. Cl.³ .................... C08G 59/68; C08G 59/70
[52] U.S. Cl. .......................... 525/327.3; 525/337; 525/340; 525/343; 525/345; 525/359.1; 525/504; 525/505; 525/506; 525/507; 528/89; 528/91; 528/92; 528/100; 528/361; 528/408; 528/410; 528/411; 528/412; 528/414; 252/160; 252/162; 252/169; 252/171
[58] Field of Search ............ 528/361, 408, 410, 411, 528/412, 414, 89, 91, 92, 100; 525/327.3, 504, 505, 506, 507, 337, 340, 343, 345, 359.1

[56] References Cited

U.S. PATENT DOCUMENTS

| 4,192,924 | 3/1980 | Crivello | 521/126 |
|---|---|---|---|
| 4,216,288 | 8/1980 | Crivello | 430/280 |
| 4,225,691 | 9/1980 | Crivello | 526/192 |
| 4,259,454 | 3/1981 | Crivello | 528/90 X |
| 4,308,118 | 12/1981 | Dudgeon | 204/159.11 |
| 4,374,751 | 2/1983 | Dudgeon | 252/426 |

FOREIGN PATENT DOCUMENTS

| 1491540 | 11/1977 | United Kingdom . |
| 1516352 | 7/1978 | United Kingdom . |
| 1539192 | 1/1979 | United Kingdom . |
| 2042550 | 9/1980 | United Kingdom . |
| 2085011 | 4/1982 | United Kingdom . |

OTHER PUBLICATIONS

F. M. Beringer et al., J. Org. Chem., 33, 2981 (1968).

*Primary Examiner*—Earl A. Nielsen
*Attorney, Agent, or Firm*—Luther A. R. Hall

[57] ABSTRACT

Compositions that cure when heated comprise
(A) an epoxide resin and
(B) an effective amount of
  (i) a diaryliodosyl salt of formula

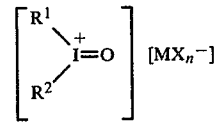

where $R^1$ and $R^2$, which may be the same or different, each represents a monovalent aromatic radical of from 4 to 25 carbon atoms, such as a substituted or unsubstituted phenyl group, M represents a metal or metalloid atom, such as phosphorus or boron, X represents a halogen atom, particularly chlorine or fluorine, and n is 4, 5, or 6, and is greater by one than the valency of M or $MX_n^-$ represents pentafluorohydroxoantimonate, and (ii) a catalyst for the diaryliodosyl salt which is a salt or complex of a d-block transition metal, a stannous salt, an organic peroxide, or an α-hydroxy compound.

Typically, the epoxide resin (A) is a bisphenol A diglycidyl ether, the salt (i) is diphenyliodosyl tetrafluoroborate or hexafluorophosphate, and the catalyst (ii) is cupric acetylacetonate or benzpinacol.

The compositions may be used in moulding materials, coatings, sealants, adhesives, composites, laminates, and impregnated tapes.

19 Claims, No Drawings

HEAT-CURABLE EPOXY COMPOSITIONS CONTAINING DIARYLIODOSYL SALTS

This invention relates to heat-curable resin compositions comprising an epoxide resin, a diaryliodosyl salt, and a catalyst to render the composition heat-curable, to the use of such compositions as moulding materials, coatings, adhesives, and sealants, and also to their use in the preparation of composites, laminates, and impregnated tapes.

It is well known that cationically polymerisable materials, including epoxide resins (i.e., substances containing, on average, more than one 1,2-epoxide group per molecule) may be photopolymerised by admixture with certain onium salts followed by irradiation with UV light. Iodonium salts that may be used for photopolymerisation are described in, for example, British Patent Specification Nos. 1 491 540, 1 516 352, and 1 539 192.

Later publications describe methods by which these, and other, onium salts can be used to heat-cure cationically polymerisable materials.

Thus, U.S. Pat. No. 4,216,288 describes heat-curable compositions comprising (A) a cationically-polymerisable organic material,
(B) an aromatic onium salt, typically an iodonium salt such as diphenyliodonium hexafluoroarsenate, and
(C) a reducing agent such as pentachlorothiophenol, ferrocene, or stannous octanoate.

British Patent Specification No. 2 042 550 describes compositions similar to those described in the above U.S. patent, the main difference being that the onium salt is restricted to an iodonium salt.

British Specification No. 2 081 271 discloses heat-curing agents that are useful in curing epoxide resins, these agents containing a mixture of an onium salt, such as an iodonium salt, and a peroxide such as dicumyl peroxide or tert.butyl perbenzoate.

Several other patent specifications disclose the use of salts or other compounds of copper with iodonium salts to form heat-activated curing agents for cationically polymerisable resins.

Thus, British Patent Specification No. 2 038 835 discloses curable compositions comprising such a resin, a diaryliodonium salt, a copper salt, and a stannous salt or an activated α-hydroxy compound such as benzoin. U.S. Pat. No. 4,192,924 discloses similar compositions but in place of a stannous salt or hydroxy compound other reducing agents may be used, specifically ascorbic acid and its derivatives.

Similar heat-curable compositions, comprising cationically polymerisable organic material, a diaryliodonium salt, a copper salt, and a reducing agent are described in British Patent Specification No. 2 055 379 and its U.S. equivalent, U.S. Pat. No. 4,225,691.

British Patent Specification No. 2 085 011 discloses heat-curable epoxide resin compositions in which the curing agent is a mixture of an aromatic onium salt, such as an iodonium salt, and an organic copper compound in which the copper is complexed, such as copper acetylacetonate.

British Patent Specification No. 2 053 226 describes heat-curable compositions comprising an epoxide resin, a mixture of an iodonium salt and a sulphonium salt of a complex halogenide, a copper salt catalyst, such as a copper halide or copper benzoate, and a mineral filler.

Surprisingly, it has now been found that certain salts containing iodine in a higher oxidation state, i.e., diaryliodosyl salts, which are inert to epoxide resins on heating alone, may be used to cure the resins if heated with a catalyst which is a salt or complex of a transition metal, especially zinc, cobalt, chromium, iron, or copper, the last being particularly preferred, a stannous salt, an organic peroxide, or an activated α-hydroxy compound such as benzoin or benzpinacol (1,2-dihydroxy-1,1,2,2-tetraphenylethane). None of these prior art references gives any indication that an iodosyl salt would bring about heat-curing of an epoxide resin in the presence of such a catalyst.

In an article by F. M. Beringer and P. Bodlaender, J. Org. Chem., 1968, 33, 2981–4, various diaryliodosyl salts and their preparation are described. That article does not, however, give any indication of the behaviour of such salts when heated in the presence of other organic materials, nor any possible utility for them.

Accordingly, this invention provides heat-curable compositions comprising (A) an epoxide resin and
(B) an effective amount of
  (i) a diaryliodosyl salt of formula

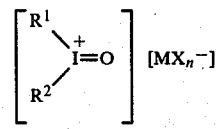   $[MX_n^-]$   I where
R$^1$ and R$^2$, which may be the same or different, each represent a monovalent aromatic radical of from 4 to 25 carbon atoms,
M represents a metal or metalloid atom,
X represents a halogen atom, and
n is 4, 5, or 6 and is greater by one than the valency of M or $MX_n^-$ represents pentafluorohydroxoantimonate, and
  (ii) as catalyst for the diaryliodosyl salt, a salt or complex of a d-block transition metal, a stannous salt, an organic peroxide, or an activated α-hydroxy compound.

This invention further provides a process for crosslinking epoxide resins which comprises heating a heat-curable composition as aforesaid to such a temperature, and for such a period of time, that the epoxide resin crosslinks.

Preferred epoxide resins for use as component (A) are those containing at least one group of formula

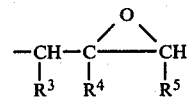   II directly attached to an atom of oxygen, where either R$^3$ and R$^5$ each represent a hydrogen atom, in which case R$^4$ denotes a hydrogen atom or a methyl group, or R$^3$ and R$^5$ together represent —CH$_2$CH$_2$—, in which case R$^4$ denotes a hydrogen atom.

As examples of such resins may be mentioned polyglycidyl and poly(β-methylglycidyl) esters obtainable by reaction of a compound containing two or more carboxylic acid groups per molecule with epichlorohydrin, glycerol dichlorohydrin, or β-methylepichlorohydrin in the presence of an alkali. Such polyglycidyl esters may be derived from aliphatic polycarboxylic acids, e.g., succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid. Other suitable polyglycidyl esters are obtainable by vinyl polymerisation of glycidyl esters of vinylic acids, especially glycidyl acrylate and glycidyl methacrylate.

Further examples are polyglycidyl and poly($\beta$-methylglycidyl) ethers obtainable by reaction of a compound containing at least two free alcoholic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, poly(oxytetramethylene)glycols, pentane-1,5-diol, hexane-2,4,6-triol, glycerol, 1,1,1-trimethylolpropane, pentaerythritol, sorbitol, and polyepichlorohydrins; from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alchols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone, 1,1,2,2-tetrakis(4-hydroxyphenyl)ethane, 2,2-bis(4-hydroxyphenyl)propane, 2,2-bis(3,5-dibromo-4-hydroxyphenyl)propane, and novolaks formed from aldehydes such as formaldehyde, acetaldehyde, chloral, and furfuraldehyde, with phenol itself, and phenol substituted in the ring by chlorine atoms or by alkyl groups each containing up to nine carbon atoms, such as 4-chlorophenol, 2-methylphenol, and 4-tert.butylphenol.

Examples of epoxide resins having groups of formula II where at least one of $R^3$ and $R^5$ conjointly denote —CH$_2$CH$_2$— are bis(2,3-epoxycyclopentyl) ether, 2,3-epoxycyclopentyl glycidyl ether, and 1,2-bis(2,3-epoxycyclopentyloxy)ethane.

Epoxide resins having the 1,2-epoxide groups attached to different kinds of oxygen atoms may be employed, e.g., the glycidyl ether-glycidyl ester of salicylic acid.

Epoxide resins in which some or all of the epoxide groups are not terminal may also be employed, such as vinylcyclohexane dioxide, limonene dioxide, dicyclopentadiene dioxide, 4-oxatetracyclo[6.2.1.0$^{2,7}$.0$^{3,5}$]undec-9-yl glycidyl ether, 1,2-bis(4-oxatetracyclo[6.2.1.0$^{2,7}$.0$^{3,5}$]undec-9-yloxy)ethane, 3,4-epoxycyclohexylmethyl 3',4'-epoxycyclohexanecarboxylate and its 6,6'-dimethyl derivative, ethylene glycol bis(3,4-epoxycyclohexanecarboxylate), 3-(3,4-epoxycyclohexyl)-8,9-epoxy-2,4-dioxaspiro[5,5]undecane, and epoxidised butadienes or copolymers of butadienes with ethylenic compounds such as styrene and vinyl acetate.

If desired, a mixture of epoxide resins may be used.

Especially preferred epoxide resins used in this invention are polyglycidyl ethers, which may have been advanced, of dihydric, trihydric, or tetrahydric phenols, e.g., 2,2-bis(4-hydroxyphenyl)propane, bis(4-hydroxyphenyl)methane, and 1,1,2,2-tetrakis(4-hydroxyphenyl)ethane, and of dihydric or trihydric aliphatic alcohols, e.g., butane-1,4-diol and hexane-2,4,6-triol.

In the diaryliodosyl salts of formula I, the groups $R^1$ and $R^2$ are preferably the same and are optionally-substituted mono-, di-, or tri-homocyclic or heterocyclic aromatic groups. Examples of suitable heterocyclic aromatic groups are thienyl, furyl, pyridyl, and pyrazolyl groups. Examples of tricyclic aromatic groups are anthryl, phenanthryl, and fluorenyl groups, while suitable mono- and dicyclic aromatic groups are phenyl and naphthyl groups, and groups of formula

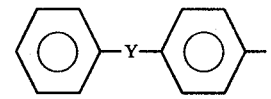

III where Y denotes a carbon-carbon bond, an ether oxygen atom, or a group of formula —CH$_2$— or —C(CH$_3$)$_2$—. Any of these aromatic groups may, if desired, be substituted by one or more atoms or groups which do not interfere with the liberation of an acid species on curing. Typical such substituents include alkyl and alkoxy groups of 1 to 4 carbon atoms, nitro groups, and halogen atoms. Preferred diaryliodosyl salts are those in which the cation is diphenyliodosyl, optionally substituted on each phenyl ring by an alkyl group of 1 to 4 carbon atoms, a nitro group or a halogen atom.

Preferred metal and metalloid atoms M in the salt of formula I are boron, phosphorus, arsenic, antimony, tin, bismuth, and iron. Fluorine and chlorine are the preferred halogens X in these compounds. Particularly preferred as the anion [MX$_n$]$^-$ in formula I are: AsF$_6^-$, SbCl$_6^-$, BiCl$_6^-$, SbF$_6^-$, SnCl$_5^-$, FeCl$_4^-$, BF$_4^-$, and PF$_6^-$, the last two being more especially preferred.

Organic peroxides that may be used as the catalyst (ii) in the curable compositions of this invention include dicumyl peroxide, tert.butyl perbenzoate, tert.butyl peroxide, and, especially, benzoyl peroxide.

A preferred stannous salt is stannous chloride.

The catalyst (ii) is preferably a salt or complex of a d-block transition metal or an activated $\alpha$-hydroxy compound. The d-block transition metals are those of the first transition series, from scandium or zinc, and those of the second transition series, from yttrium to cadmium. As already indicated, the preferred transition metals, the salts or complexes of which are used as catalyst (ii), are zinc, cobalt, chromium, iron and, more especially preferred, copper. The salts may be of organic or mineral acids, such as chlorides, acetates, trichloroacetates, naphthenates, octanoates, and oxalates. Suitable complexes are $\pi$-orbital complexes and those formed with ligands which form inner complexes and are aldehydes, ketones, carboxamides, and aliphatic aminomonocarboxylic and aminopolycarboxylic acids. Especially preferred complexes are those formed with 1,3-diketones such as acetylacetone, its homologues, e.g., benzoylacetone, and its derivatives, e.g., ethyl acetoacetate.

The activated $\alpha$-hydroxy compound is a compound having a hydroxy group attached to a carbon atom which is alpha to an activating group such as a carbonyl group or a carbon atom having a hydroxy group attached thereto, the compound forming free radicals on heating. Suitable activated α-hydroxy compounds include ascorbic acid, ketones such as acyloins and benzoins, and activated diols such as pinacol and its homologues, especially benzpinacol.

If desired, certain of the catalysts (ii) may be used together, for example, a transition metal salt or complex, such as copper acetylacetonate or cupric benzoate, may be used with ascorbic acid or with benzpinacol.

The amount of diaryliodosyl salt (i) used in accordance with this invention is not critical since only catalytic quantities are needed to bring about curing. Generally there will be used 0.01% to 10% by weight, and preferably from 0.5% to 5% by weight, calculated on the weight of epoxide resin.

Similarly, the amount of catalyst (ii) is not critical but will generally be from 10% to 150% by weight, calculated on the weight of diaryliodosyl salt used.

Other materials which may be incorporated in the compositions of this invention include diluents, fillers such as silica, talc, glass microballoons, clays, powdered metals or zinc oxide, viscosity modifiers such as asbestos, rubbers, tackifiers, and pigments.

Diaryliodosyl salts of formula I may be prepared by a method similar to that described by F. M. Beringer and P. Bodlaender, loc. cit. An iodoarene of formula IV is oxidised to the corresponding iodoxyarene of formula V, for example using peracetic acid. Treatment of the iodoxyarene, or a mixture of two iodoxyarenes, with an alkali metal hydroxide gives the diaryliodosyl hydroxide of formula VI.

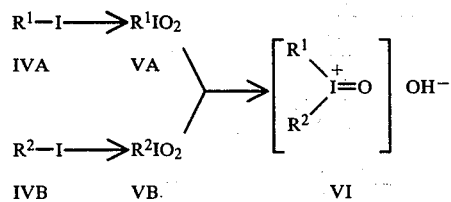

This hydroxide may be treated with an acid of formula $HMX_n$ (where such acids exist) or its alkali metal or ammonium salt to give the desired diaryliodosyl salt of formula I. (In this reaction scheme all symbols are as hereinbefore defined).

Alternatively, the hydroxide of formula VI may be converted into the corresponding carbonate by treatment with carbon dioxide, and the carbonate treated with an acid $HMX_n$ to give the diaryliodosyl salt of formula I.

As a further alternative the hydroxide of formula VI, or the corresponding carbonate, may be converted into the acetate of formula VI or trifluoroacetate of formula VIII, and thence, by treatment with an alkali metal or quaternary ammonium salt of the acid $HMX_n$, into the desired diaryliodosyl salt of formula I

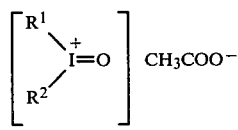
VII

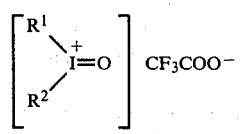
VIII

Double decomposition with an aqueous solution of an alkali metal hexafluoroantimonate affords, due to hydrolysis, the pentafluorohydroxoantimonate of formula I: to obtain the corresponding hexafluoroantimonate it is necessary to add the alkali metal hexafluoroantimonate as a solid.

The compositions of this invention are rapidly converted into a cured state by heating to a temperature above 50° C., preferably to a temperature within the range 80° C. to 180° C., and are suitable for use as moulding materials, coatings, sealants, adhesives, and, when combined with reinforcement, especially reinforcing fibres, as composites, including sheet-moulding compounds, laminates, and impregnated tapes.

This invention is illustrated by the following Examples in which all parts are by weight.

Diphenyliodosyl hexafluorophosphate is prepared by any of the following routes:

a. Diphenyliodosyl acetate monohydrate (1.87 g) prepared as described by F. M. Beringer and P. Bodlaender, (loc. cit.) is dissolved in boiling water (25 ml), treated with decolourising charcoal, and filtered hot. The filtrate is treated with a saturated aqueous solution of potassium hexafluorophosphate, which is added slowly until further addition caused no further precipitation. The mixture is then cooled and filtered. The residue is dried over phosphorus pentoxide in vacuo at room temperature to give diphenyliodosyl hexafluorophosphate (0.87 g), m.pt. 120°–130° C. (decomp.).

b. Iodoxybenzene (3.37 g) is added to a stirred 1N solution of sodium hydroxide at 0° C. After 2 hours the mixture is filtered and a solution of potassium hexafluorophosphate (1.32 g) in water (5 ml) is added. A flocculent precipitate forms immediately. This is filtered off, washed with ice-cold water, and dried over phosphorus pentoxide. It is recrystallised from a mixture of chloroform and petroleum ether, boiling range 40°–60° C., to give diphenyliodosyl hexafluorophosphate (0.18 g), m.pt. 130° C. (decomp.).

c. Diphenyliodosyl trifluoroacetate (4.1 g), prepared according to F. M. Beringer and P. Bodlaender, (loc, cit.), is added portionwise to boiling water to give a complete solution, then treated with charcoal and filtered hot. The hot filtrate is treated with a saturated aqueous solution of potassium hexafluorophosphate (1.84 g) and the resultant clear solution is cooled. A white precipitate forms and is filtered off to give diphenylisodosyl hexafluorophosphate (2.72 g) mpt. 135°–136° C. (decomp.).

Diphenyliodosyl tetrafluoroborate is prepared as follows:

Iodoxybenzene (35.4 g) is added to a 1N solution of sodium hydroxide (300 ml) which is stirred and cooled to 0° C. After 2 hours the precipitate is removed by filtration and the filtrate treated with carbon dioxide until neutral.

A portion of this neutralised solution (100 ml) is stirred and fluoroboric acid (40%) is added slowly. When evolution of carbon dioxide ceases a further quantity of this acid (2 ml) is added. The precipitate which forms is filtered off, washed with ice-cold water, and dried to give diphenyliodosyl tetrafluoroborate, (2.4 g) m.pt. 110°–120° C. (decomp.).

Bis(4-methylphenyl)iodosyl hexafluorophosphate is prepared as follows:

Bis(4-methylphenyl)iodosyl trifluoroacetate (1.16 g), prepared as described by F. M. Beringer and P. Bodlaender (loc. cit.), is dissolved in boiling water (90 ml), filtered, and a saturated aqueous solution of potassium hexafluorophosphate (0.49 g) is added. The white precipitate is filtered off and dried to give bis(4-methylphenyl)iodosyl hexafluorophosphate (0.68 g). m.pt. 125° C. (decomp.).

In a similar manner, but starting from bis(2-methylphenyl)iodosyltrifluoroacetate, itself prepared according to F. M. Beringer and P. Bodlaender (loc. cit.), there is obtained bis(2-methylphenyl)iodosyl hexafluorophosphate, m.pt. 148°–150° C. (decomp.).

In a similar manner, but starting from bis(4-fluorophenyl)iodosyl trifluoroacetate (itself prepared according to F. M. Beringer and P. Bodlaender, loc. cit.) there is obtained bis(4-fluorophenyl)iodosyl hexafluorophosphate, m.pt. 126° C. (decomposition).

In a similar manner, but starting from bis(4-isopropylphenyl)iodosyl trifluoroacetate (itself prepared by a similar method to that described by F. M. Beringer and P.. Bodlaender, loc. cit.) there is obtained bis(4-isopropylphenyl) iodosyl hexafluorophosphate, m.pt. 84° C.

Diphenyliodosyl hexafluoroarsenate is prepared as follows:

Diphenyliodosyl trifluoroacetate (1.2 g; prepared according to the method of F. M. Beringer and P. Bodlander, loc. cit.) is dissolved in hot water, treated with charcoal and filtered hot. An aqueous solution of potassium hexafluoroarsenate (0.7 g) is added to the filtrate and the resultant solution cooled. The white precipitate which forms is collected by filtration and dried in air to give diphenyliodosyl hexafluoroarsenate (0.64 g), m.pt. 135°–138° C. (decomposition).

Diphenyliodosyl hexafluoroantimonate is prepared as follows:

Diphenyliodosyl trifluoroacetate (1.23 g) is dissolved in 30 ml of hot water. Sodium hexafluoroantimonate (0.78 g) is added and the resulting solution is cooled to 0° C. overnight. The white crystalline solid which forms is collected by filtration to afford 0.5 g of diphenyliodosyl hexafluoroantimonate m.pt. 142°–144° C. (decomposition).

"Epoxide resin I" denotes a polyglycidyl ether of 2,2-bis(4-hydroxyphenyl)propane, having a 1,2-epoxide content of 5.16 equivs./kg.

"Epoxide resin II" denotes 3,4-epoxycyclohexylmethyl 3',4'-epoxycyclohexanecarboxylate, having a 1,2-epoxide content of 7.3 equivs./kg.

EXAMPLES 1–10

Epoxide resin I (10 parts) is mixed with diphenyliodosyl hexafluorophosphate (0.3 part), the catalyst of the type and quantity stated, and sufficient acetone to ensure an even suspension. The gel times of these compositions at various temperatures are measured by heating them on a Kofler bench. Details of the catalysts, and the results found, are given in the following Table.

TABLE 1

| Example No. | Catalyst Type | Parts | Gel Time at 80° C. | 120° C. | 150° C. | 180° C. |
|---|---|---|---|---|---|---|
| Control | None | — | | >16 hr | >16 hr | >1½ hr <16 hr |
| 1 | cupric acetate | 0.05 | 30 min. | 5 min. | — | — |
| 2 | cupric acetylacetonate | 0.15 | — | 4 min. | — | — |
| 3 | cupric acetylacetonate | 0.15 | 6 min. | — | — | — |
|   | ascorbic acid | 0.15 | | | | |
| 4 | zinc acetate | 0.2 | — | — | — | 45 min. |
| 5 | cupric trichloroacetate | 0.2 | — | 1¼ min. | — | — |
| 6 | cuprous chloride | 0.15 | — | 10 min. | — | — |
| 7 | chromium oxalate (soln. contg. 5% Cr) | 0.4 | — | — | 40 min. | 40 min. |
| 8 | cobalt naphthenate (soln. contg.) 8% Co) | 1.12 | — | — | — | 55 min. |
| 9 | ferrocene | 0.3 | — | — | — | 5 sec. |
| 10 | stannous chloride | 0.4 | — | — | 26 min. | 4½ min. |

EXAMPLES 11 AND 12

The method of Examples 1–10 is repeated, replacing the epoxide resin used in those Examples by Epoxide resin II (10 parts). The results are given in the following Table.

TABLE 2

| Example No. | Catalyst Type | Parts | Gel time at 120° C. | 150° C. |
|---|---|---|---|---|
| Control | None | | 1¼ hr. | 1½ hr. |
| 11 | cupric acetylacetonate | 0.15 | 2¼ min. | — |
| 12 | benzoyl peroxide (as a 50% soln. in dibutyl phthalate) | 0.3 | — | 13 min. |

EXAMPLES 13 AND 14

The method of Examples 1–10 is repeated, replacing the diphenyliodosyl salt used in those Examples by an equal weight of bis(4-methylphenyl)iodosyl hexafluorophosphate or diphenyliodosyl tetrafluoroborate. The catalyst in both cases is benzpinacol. The amounts used, and the gel times obtained, are shown in the following Table.

TABLE 3

| Example No. | Iodosyl salt | Parts of benzpinacol | Gel time at 150° C. | 180° C. |
|---|---|---|---|---|
| Control | bis(4-methyl phenyl)-iodosyl hexafluorophosphate | None | — | >17 hr. |
| 13 | bis(4-methyl phenyl)-iodosyl hexafluorophosphate | 0.5 | — | 5 sec. |
| Control | diphenyliodosyl-tetrafluoroborate | None | >16 hr. | >16 hr. |
| 14 | diphenyliodosyl-tetrafluoroborate | 0.54 | 5 min. | 20 sec. |

EXAMPLES 15-17

The method of Examples 1-10 is repeated, replacing the diphenyliodosyl salt used in those Examples with an equal amount of bis(2-methylphenyl)iodosyl hexafluorophosphate for Examples 15 and 16 or bis(4-isopropylphenyl)iodosyl hexafluorophosphate for Example 17. The catalysts and the gel times obtained are recorded in the following table.

TABLE 4

| Example No. | Catalyst | Parts of catalyst | Gel time at 120° C. | Gel time at 150° C. |
|---|---|---|---|---|
| 15 | cupric acetylacetonate | 0.15 | 8½ mins. | 1 min 10 secs. |
| 16 | cupric acetate | 0.15 | — | 5½ mins. |
| 17 | cupric acetylacetonate | 0.15 | 6¼ mins. | 50 seconds |

EXAMPLE 18

The method of Examples 1 to 10 is repeated using Epoxide resin II (50 parts), butane-1,4-diol diglycidyl ether having an epoxide content of 9.35 eqivs./kg. (50 parts), bis(4-fluorophenyl)iodosyl hexfluorophosphate (0.3 part) as initiator and cupric acetate (0.1 part) as accelerator in suspension in acetone (0.5 part). Gel times of 9 minutes at 150° C. and 20 minutes at 120° C. are obtained.

EXAMPLE 19

The method of Examples 1-10 is followed using Epoxide resin I (10 parts), diphenyliodosyl hexafluoroarsenate (0.3 part), cupric acetylacetonate (0.1 part) and acetone (0.3 part). Gel times of 5½ minutes at 120° C. and 40 seconds at 150° C. are obtained.

EXAMPLE 20

The method of Examples 1-10 is followed using Epoxide resin II (10 parts), diphenyliodosyl hexafluoroantimonate (0.3 part) and cupric acetylacetonate (0.1 part). Gel times of 1½ minutes at 120° C. and 12 minutes at 150° C. are obtained.

What is claimed is:

1. A heat-curable composition comprising
   (A) an epoxide resin and
   (B) an effective amount of
   (i) a diaryliodosyl salt of formula

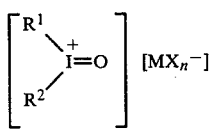

where
   $R^1$ and $R^2$, which may be the same or different, each represent a monovalent aromatic radical of from 4 to 25 carbon atoms,
   M represents a metal or metalloid atom,
   X represents a halogen atom, and
   n is 4, 5, or 6, and is greater by one than the valency of M or $MX_n^-$ represents pentafluorohydroxoantimonate, and
   (ii) as catalyst for the diaryliodosyl salt, a salt or complex of a d-block transition metal, a stannous salt, an organic peroxide, or an activated α-hydroxy compound.

2. A composition as claimed in claim 1, in which $R^1$ and $R^2$ are the same.

3. A composition as claimed in claim 1, in which $R^1$ and $R^2$ represent optionally substituted thienyl, furyl, pyridyl, pyrazolyl, anthryl, phenanthryl, fluorenyl, phenyl, or naphthyl groups, or groups of formula

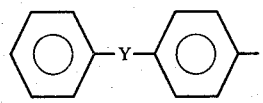

III where Y denotes a carbon-carbon bond, an ether oxygen atom, or a group of formula —$CH_2$— or —$C(CH_3)_2$—.

4. A composition as claimed in claim 3, in which $R^1$ and $R^2$ are substituted by an alkyl or alkoxy group of 1 to 4 carbon atoms, a nitro group or a halogen atom.

5. A composition as claimed in claim 1, in which M represents a boron, phosphorus, arsenic, antimony, tin, bismuth, or iron atom.

6. A composition as claimed in claim 1, in which X represents fluorine or chlorine.

7. A composition as claimed in claim 6, in which $MX_n^-$ is $AsF_6^-$, $SbCl_6^-$, $BiCl_6^-$, $SbF_6^-$, $SnCl_5^-$, $FeCl_4^-$, $BF_4^-$, or $PF_6^-$.

8. A composition as claimed in claim 1, in which the catalyst (ii) is dicumyl peroxide, tert.butyl perbenzoate, tert.butyl peroxide, or benzoyl peroxide.

9. A composition as claimed in claim 1, in which the catalyst (ii) is a salt or complex of zinc, cobalt, chromium, iron, or copper.

10. A composition as claimed in claim 9, in which the catalyst (ii) is a chloride, acetate, trichloroacetate, naphthenate, octanoate, or oxalate.

11. A composition as claimed in claim 9, in which the catalyst (ii) is a π-orbital complex or a complex with a ligand which forms an inner complex and is an aldehyde, ketone, carboxamide, or an aliphatic aminomonocarboxylic, or aminopolycarboxylic acid.

12. A composition as claimed in claim 11, in which the catalyst is a complex formed with a 1,3-diketone.

13. A composition as claimed in claim 1, in which the catalyst (ii) is ascorbic acid, in acyloin, a benzoin, pinacol, or benzpinacol.

14. A composition as claimed in claim 1, which contains 0.01% to 10% by weight of the diaryliodosyl salt (i) calculated on the weight of epoxide resin.

15. A composition as claimed in claim 1, which contains from 10% to 150% by weight of the catalyst (ii), calculated on the weight of diaryliodosyl salt.

16. A process for crosslinking epoxide resins which comprises
   (1) forming a composition as claimed in claim 1, and
   (2) heating the composition to such a temperature and for such a time that the epoxide resin crosslinks.

17. A process as claimed in claim 16, in which the composition is heated to a temperature above 50° C.

18. A process as claimed in claim 17, in which the composition is heated to a temperature within the range 80° to 180° C.

19. Cured products made by a process as claimed in claim 16.

* * * * *